United States Patent [19]

Moore

[11] 4,262,889
[45] Apr. 21, 1981

[54] ELASTOMERIC ENGINE MOUNT
[75] Inventor: Charles D. Moore, Birmingham, Mich.
[73] Assignee: Ford Motor Company, Dearborn, Mich.
[21] Appl. No.: 49,530
[22] Filed: Jun. 18, 1979
[51] Int. Cl.³ .............................................. F16M 1/02
[52] U.S. Cl. ................................................. 267/140.5
[58] Field of Search ............. 188/1 B; 267/140, 140.5, 267/141, 63 R

[56] References Cited

U.S. PATENT DOCUMENTS

| | | | |
|---|---|---|---|
| 2,257,804 | 10/1941 | Lord | 267/141 |
| 2,880,947 | 4/1959 | Peirce | 267/141 |
| 3,095,187 | 6/1963 | Sweeny et al. | 267/141 X |

FOREIGN PATENT DOCUMENTS 652309  4/1951  United Kingdom .................. 267/140.5

*Primary Examiner*—Duane A. Reger
*Attorney, Agent, or Firm*—Steven L. Permut; Clifford L. Sadler

[57] ABSTRACT

An engine mount includes an upper and lower bracket bonded together by an elastomeric block which is made from a rubber material embedded with parallel graphite fibers. The elastomeric block has a higher shear strength in one horizontal direction as compared to a shear strength in its transverse horizontal direction to form an engine mount that has different shear strengths along different horizontal axes.

6 Claims, 4 Drawing Figures

U.S. Patent  Apr. 21, 1981  4,262,889
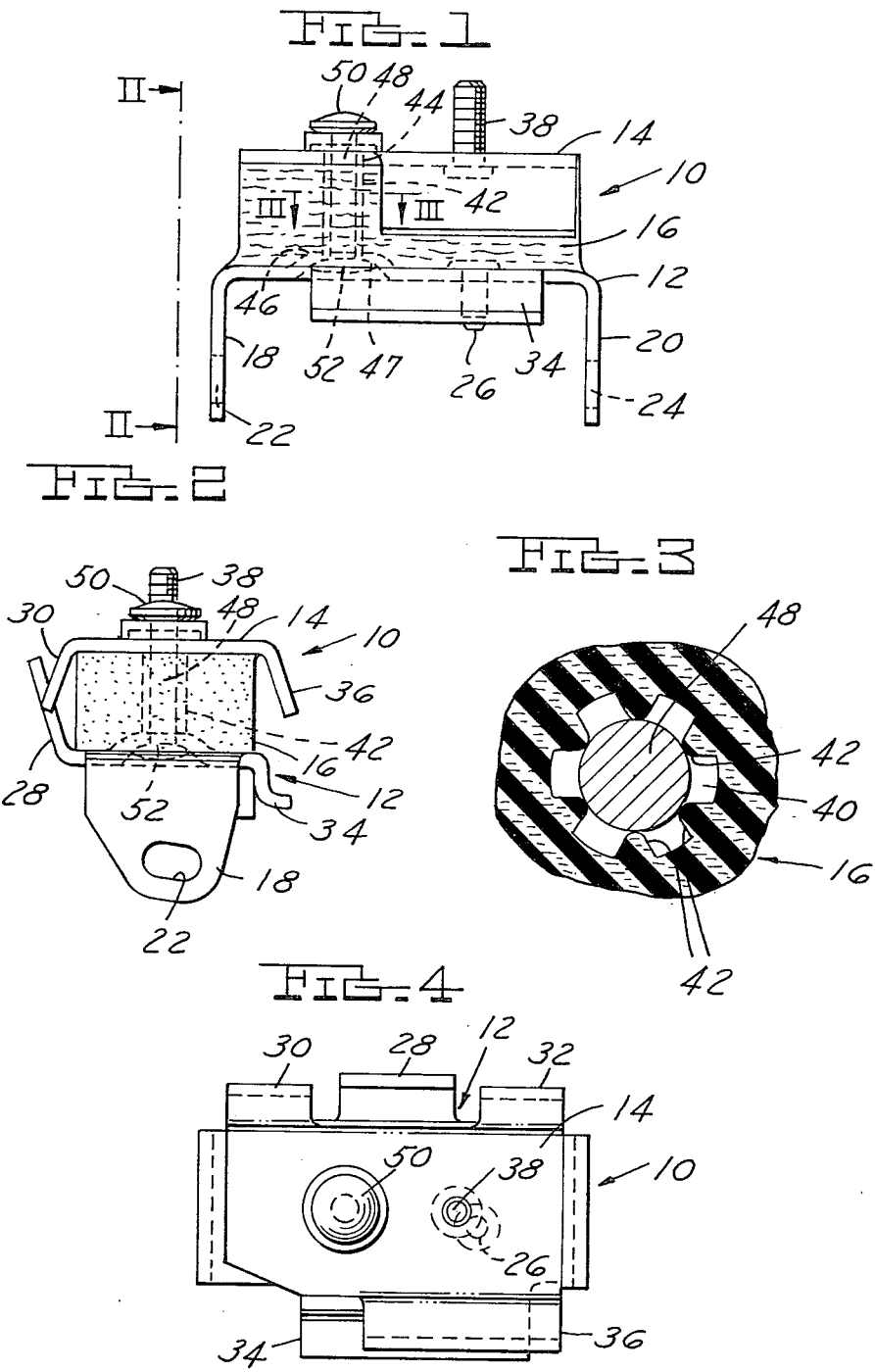

ELASTOMERIC ENGINE MOUNT

BACKGROUND OF THE INVENTION

1. Field of the Invention

This invention relates to an engine mount and more particularly to an elastomeric engine mount which has different shear strengths in different horizontal directions.

2. Description of the Prior Art

Engine mounts mount an engine to the frame or cradle of a motor vehicle. The engine mount, besides securing the engine to the frame or cradle, should also isolate vibrations emanating from the engine and to compensate for drive line axial stresses which are exerted onto the engine.

An engine mount which includes a uniform elastomeric material that inherently provides different rates of elasticity is shear in different horizontal directions is desireable for the purposes of isolating vibrations and lowering costs.

One way of mounting the engine to isolate many vibrations is using an elastomeric material interposed between an upper and lower bracket of an engine mount. Such engine mounts, as disclosed in U.S. Pat. No. 4,151,822 issued to Tatsuhiko Miura on May 1, 1979, have elastomeric material bonded between an upper and lower bracket.

In addition, brackets are known which incorporate elastomeric materials with different resiliency rates in different horizontal directions. Extra amounts of rubber or harder rubber are placed into strategic locations in the bracket mount or cavities are formed therein to provide differing amounts of resiliency in different horizontal directions. One such elastic mount is disclosed in U.S. Pat. No. 2,958,526 to Ulderup et al on Nov. 1, 1960.

The joining of rubber components of different hardnesses, or the formation of cavities in a rubber block, in order to make an engine mount having different rates of resiliency in different directions make the engine mounts more expensive than necessary.

SUMMARY OF THE INVENTION

According to the invention, an engine mount has an engine bracket connectible to the frame of a motor driven vehicle and an upper bracket connectible to an engine. The upper and lower brackets are bonded together by an elastomeric block which is interposed between the upper and lower bracket and bonded to the brackets. The elastomeric block comprises an elastomeric material and individual elongated fibers of fibrous material embedded in the elastomeric material in substantially horizontal and parallel directions such that the shear strength of the elastomeric block is higher in one horizontal direction than in the transverse horizontal direction.

Desireably, the fibrous material comprises between five and twenty-five percent by weight of the elastomeric block and is made from nylon, short fiber cotton, rayon, or graphite material. In addition, the fiber preferably has dimensions between 0.0025 of an inch and 0.0035 of an inch in diameter and a length of approximately ⅛ to ¼ of an inch.

BRIEF DESCRIPTION OF THE DRAWINGS

Reference now will be made to the following drawings in which:

FIG. 1 is a side elevational view of one embodiment of an engine mount constructed according to the invention.

FIG. 2 is an elevational view of the forward end of the engine mount taken along the lines II—II shown in FIG. 1.

FIG. 3 is a cross sectional view taken along the lines III—III shown in FIG. 1.

FIG. 4 is a top plan view of the embodiment shown in FIG. 1.

DETAILED DESCRIPTION OF THE PREFERRED EMBODIMENT

Referring now to FIG. 1, an engine mount 10 has a lower bracket 12 and an upper bracket 14 bonded to an elastomeric block 16 interposed between the brackets 12, 14. The lower bracket 12 has two depending end flanges 18 and 20 each with an aperture 22 and 24 aligned to receive a bolt 3 (not shown) for mounting bracket 12 to the frame of a vehicle in a conventional manner. In addition, a lug 26 extends downwardly from the bracket 12 to position the lower bracket 12 with respect to the frame (not shown).

As shown in FIGS. 2 and 4, the lower bracket 12 has an upwardly extending side flange 28 which angles away from the elastomeric block 16. The flange 28 is interposed between two downwardly extending longitudinally aligned and spaced flanges 30 and 32 from upper bracket 14. The opposite side of the lower bracket 12 has a depending side flange 34.

The upper bracket 14 has a downwardly extending side flange 36 on the side of the bracket opposite the longitudinally aligned flanges 30 and 32. All the flanges 30, 32 and 36 angle away from the elastomeric block 16. Threaded lug 38 upwardly extends through the upper bracket 14 to be bolted onto the engine (not shown).

The elastomeric block 16 is made from rubber interspersed with horizontally aligned fibers. The fibers can be made from any number of fibrous materials such as graphite, nylon, cotton, or rayon. Graphite fibers are preferred. The fiber is mixed in with the natural rubber material and extruded through a nozzle which will align the individual fibers so that they are parallel to each other. A second method of manufacturing rubber could be rolling it between rollers to force the fibers to obtain parallel positions.

The dimension of the fibers should be approximately ⅛ of an inch long by 0.003 of an inch in diameter. However, the dimensions can vary and range between ⅛ of an inch and ¼ of an inch in length, and from 0.0025 to 0.0035 of an inch in diameter. The fibrous material should comprise approximately 20% of the total weight of the elastomeric block. Variations are also acceptable, with a range of 5% to 25% by weight being the fibrous material.

The rate of resilient deflection in shear of the elastomeric block 16 with respect to the fore and aft axial displacement, (i.e. as shown in FIG. 1, displacement to the left and right), should be about 3000 pounds per inch. The rate of resilient deflection in shear of the elastomeric block in the lateral or side to side direction, (i.e. left to right or right to left as shown in FIG. 2), should be approximately 2000 pounds per inch.

After the elastomeric block 16 has been formed and shaped, the block is bonded onto the upper and lower brackets with conventional bonding agent in the conventional fashion.

The elastomeric block 16 has an aperture 40 therethrough. As more clearly shown in FIG. 3, the aperture 40 has an undulating surface with intrusions 42 inwardly extending toward the central axis of aperture 40. An aperture 46 in lower bracket 12, passing through a recessed section 47, is also aligned under aperture 40. Apertures 46 and 44 are sized to provide a clearance for a pin or rivet 48 which passes therethrough. The pin 48, as shown in FIG. 3, is positioned by the inwardly extending intrusion 42. The pin has two enlarged heads 50 and 52 clamping the upper bracket 14, lower bracket 12, and elastomeric block 16 vertically together, but allows horizontal shearing of the mount.

In operation, the engine is mounted onto the frame by at least two of the engine mounts 10, which would be located on either side of the engine. The engine, during normal operation, vibrates, rocks and rolls with respect to the frame. The two engine mounts 10, in combination with a third mount supporting the transmission housing which is rigid with the engine, are positioned to form a triangular pattern. Each mount 10 is positioned such that the elongated fibers within the elastomeric block 16 are parallel to the axis of rotation of the crankshaft of the engine. In a rear wheel drive car, the direction of the fibers will normally follow the length of the motor vehicle. As the engine rolls about the axis of the crankshaft, the upper flange 14 and the elastomeric block 16, as shown in FIG. 2, will shift or tilt to the left or right until the block 16 abuts either the flange 28 or the flanges 30 and 32 whereby further displacement of bracket 12 relative to bracket 14 is prevented. The flange 28 and flanges 30 and 32 prevent excessive shear of the block 16. The pin 48 will articulate within the apertures 48 and 46 during roll movement of the engine.

Any forward displacement of the engine will be absorbed by the elastomeric block which absorbs 3000 pounds per inch in the fore and aft direction. Again the pin 48 articulates within its aperture 44 and 46. Vertical motion of the engine will be absorbed by either compression or tension of the elastomeric block 16 at a rate of about 3000 pounds per inch.

If per chance the bond between the elastomeric block 16 and the brackets 12 and 14 does not function properly or the elastomeric block 16 itself fragments, the brackets 12 and 14 retain the engine in its proper position against excessive forward or rearward motion. Flange 28 abuts against either flange 30 or 32 depending on the direction of motion of the engine. In addition, pin 48 prevents the bracket 14 from being elevated with respect to the lower bracket 12 which retains the flange 28 interposed between the two flanges 30 and 32.

In this fashion, an engine block is constructed which allows for different absorption rates of vibration in a transverse direction for engine rolling than in a fore and aft direction.

Variations and modifications of the present invention are possible without departing from its scope and spirit which is defined by the appended claims.

The embodiments of the invention in which an exclusive property or privilege is claimed are defined as follows:

1. An engine mount comprising:
   a lower bracket connectible to a frame of a motor driven vehicle;
   an elastomeric block interposed between the upper and lower bracket and bonded to said brackets;
   said elastomeric block comprising elastomeric material and elongated individual fibers of fibrous material embedded therein in substantially horizontal and parallel directions such that the rate of resilient deflection is shear of said engine mount is higher in one horizontal direction than in a transverse horizontal direction;
   wherein said upper bracket has opposing depending flanges spaced apart from said elastomeric block and extending parallel to the longitudinal direction of said fibers such that upon a predetermined amount shear, one of said flanges abuts said elastomeric block and constructed to halt further shearing of said elastomeric block.

2. An engine mount as defined in claim 1 wherein said fibrous material comprises between five percent and twenty-five percent by weight of said elastomeric block.

3. An engine mount as defined in claim 1 wherein:
   said fibers have a diameter between 0.0025 inches (0.0636 mm) and 0.0035 inches (0.089 mm);
   and a length of approximately from $\frac{1}{8}$ of an inch (3.17 mm) to $\frac{1}{4}$ of an inch (6.35 mm).

4. An engine mount as defined in claim 1 or 3 wherein said fiber is selected from the group consisting of: nylon, short fiber cotton, rayon, and graphite fibers.

5. An engine mount as defined in claim 1 further comprising:
   said lower bracket having an upwardly depending flange interposed between two longitudinally aligned flanges of said upper bracket with a clearance therebetween;
   said upwardly extending flange abutting either of said longitudinally aligned flanges of said upper bracket upon a predetermined amount of relative longitudinal movement of said lower bracket with said upper bracket to prevent such further longitudinal movement.

6. An engine mount as defined in claim 5 further comprising:
   a vertical extending aperture through said elastomeric block with sides of said aperture being undulated with inwardly extending elastomeric intrusions integral with said block;
   apertures through said upper and lower brackets aligned with said aperture through said block;
   an interlocking shaft passing through said aligned apertures sized to retain a clearance between itself and edges of said apertures and in contact with said undulating intrusions;
   said interlocking shaft having enlarged ends retaining said shaft in engagement with said apertures and retaining said upper bracket and lower bracket in vertical proximity independently of said bond of said elastomeric block with said brackets.

* * * * *